US012447092B2

(12) United States Patent
Zhao et al.

(10) Patent No.: US 12,447,092 B2
(45) Date of Patent: Oct. 21, 2025

(54) BATHTUB MASSAGE NOZZLE WITH GOOD MASSAGE EFFECT

(71) Applicant: Guangzhou Rising Dragon Recreation Industrial Co., Ltd., Guangzhou (CN)

(72) Inventors: Huaibin Zhao, Guangzhou (CN); Xuewen Liu, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 99 days.

(21) Appl. No.: 18/600,798

(22) Filed: Mar. 11, 2024

(65) Prior Publication Data

US 2025/0107955 A1 Apr. 3, 2025

(30) Foreign Application Priority Data

Sep. 28, 2023 (CN) ........................ 202311270866.X

(51) Int. Cl.
*A61H 9/00* (2006.01)
*A61H 33/00* (2006.01)

(52) U.S. Cl.
CPC ....... *A61H 9/0021* (2013.01); *A61H 33/0087* (2013.01); *A61H 33/6021* (2013.01)

(58) Field of Classification Search
CPC .............. A61H 9/0021; A61H 33/0087; A61H 33/6021; A61H 33/027; A61H 33/6063; A61H 9/005; A47K 3/022; B05B 7/0018; B05B 7/0416; B05B 7/26
USPC ................ 4/541.1, 538, 491, 493, 545, 668; 126/373.1, 390.1; 601/160
See application file for complete search history.

(56) References Cited

U.S. PATENT DOCUMENTS 3,905,358 A * 9/1975 Jacuzzi ................ A61H 33/027 601/169
4,225,984 A * 10/1980 Lindsey ............. A61H 33/0087 4/541.3
6,807,689 B1 * 10/2004 Royko ................... A61H 33/60 4/546
10,506,899 B2 * 12/2019 Szutkowski ........... A47K 3/007
(Continued)

FOREIGN PATENT DOCUMENTS

CN 117324139 A * 1/2024 ......... A61H 33/6063
CN 117463522 A * 1/2024 ......... A61H 33/6063
(Continued)

*Primary Examiner* — Lori L Baker
(74) *Attorney, Agent, or Firm* — Andrew C. Cheng

(57) ABSTRACT

A bathtub massage nozzle includes a nozzle body, a nozzle body Venturi core, a bushing and a nozzle surface cover. The bathtub massage nozzle reduces the dilution and loss of bubbles in the process of water flow transmission. Therefore, the water flow can form dense bubbles in the nozzle, which are guided by the nozzle surface cover and released along a specific area of the bathtub. The massage water flow released by the nozzle surface cover carries more dense bubbles, which can enhance the strength and effect of massage. The nozzle surface cover and the bushing can be conveniently rotated to adjust the direction of the surface cover. Thus, different surface covers in the same bathtub can be kept in the same direction. In addition, position of the water outlet hole changes during rotation of the nozzle surface cover. Thus, the user can adjust position of the massage water outlet as needed.

10 Claims, 9 Drawing Sheets

(56) References Cited

U.S. PATENT DOCUMENTS

| | | | | |
|---|---|---|---|---|
| 2003/0213059 | A1* | 11/2003 | Mattson, Jr. ........... | B01D 29/03 4/541.1 |
| 2005/0283902 | A1* | 12/2005 | Mattson ............. | A61H 33/6063 4/541.1 |

FOREIGN PATENT DOCUMENTS

| | | | | | |
|---|---|---|---|---|---|
| CN | 221016697 | U | * | 5/2024 | ........... A61H 33/027 |
| CN | 221016698 | U | * | 5/2024 | ......... A61H 33/6063 |
| JP | 2006034829 | A | * | 2/2006 | ......... A61H 33/6063 |

* cited by examiner

BATHTUB MASSAGE NOZZLE WITH GOOD MASSAGE EFFECT

TECHNICAL FIELD

The present invention relates to the technical field of bathtub nozzles, in particular to a bathtub massage nozzle with a good massage effect.

BACKGROUND

In modern society, with the increasing pursuit of quality of life, leisure and relaxation become more and more important. As a way to enjoy comfort and health, bathtub massage has been widely concerned and loved. Bathroom massage can relieve physical fatigue, promote blood circulation and improve psychological comfort, thus achieving the effect of relieving stress and improving health.

However, although the traditional bathtub massage nozzle has certain advantages in providing comfortable bubble massage experience, its design limitations gradually appear. The main problem stems from the relatively close arrangement of the water nozzle and the air inlet in the traditional design, which limits the bubble generation effect and stability to some extent. Specifically, the distance between the water inlet and the air inlet of the Venturi core of the traditional bathtub massage nozzle is relatively short, resulting in a relatively long air injection path after the water flows into the nozzle body. This makes the bubbles easily diluted in the process of water flow transmission, and some bubbles may merge or disappear on the way, thus reducing the density and quality of bubbles. Due to the lack of bubble stability, the traditional nozzle may have intermittent bubbles and trickle during use, which affects the consistency and comfort of massage effect. In addition, due to the scarcity and uneven distribution of bubbles, the traditional bathtub massage nozzle may not fully cover the body parts in the bathtub, thus failing to achieve a uniform massage effect. Users may feel that the massage in some parts is weak, and even cannot feel the stimulation of bubble massage. This further reduces the overall quality of the massage experience.

Therefore, although the traditional bathtub massage nozzle has certain advantages in generating bubbles and providing massage, its design limitations limit the effect and stability of bubble massage. This is also the problem that is continuously being improved in the field of massage nozzles.

SUMMARY

The present invention aims to provide a bathtub massage nozzle with a good massage effect, which solves that limitation existing in the traditional design, thereby providing a more excellent and stable bathtub massage experience.

A bathtub massage nozzle, comprising a nozzle body, a nozzle body Venturi core, a bushing and a nozzle surface cover. The nozzle body comprises a water inlet end and a water spraying end opposite to the water inlet end. The water inlet end is provided with a water inlet and an air inlet, and the air inlet is closer to the water spraying end than the water inlet. The water spraying end is formed with an accommodating through hole for receiving the bushing. The nozzle body Venturi core is hollow and configured as a water channel in a length direction, two ends of the nozzle body Venturi core are welded with an inner side wall of the water inlet end of the nozzle body, and one of the two ends of the nozzle body Venturi core far from the water spraying end is hermetically welded between the water inlet and the air inlet. The bushing is arranged at the water spraying end and comprises a water inlet channel which is connected with the nozzle body Venturi core; a sealing rubber ring is arranged on an outer side wall of the bushing far away from the nozzle body Venturi core, and the sealing rubber ring is tightly connected with an inner wall of the nozzle body; the side of the bushing far away from the nozzle body Venturi core is provided with the nozzle surface cover; and a side of the bushing close to the nozzle surface cover is provided with air outlet holes, and air outlet ends of the air outlet holes are located in a gap between the bushing and the nozzle face cover. The end of the nozzle body Venturi core far away from the water spraying end is provided with an air cavity communication port, and the air cavity communication port communicates a gap between the nozzle body Venturi core and the nozzle body and a gap between the bushing and the nozzle body, so as to form a closed air cavity connected with the air outlet holes.

Preferably, the nozzle body Venturi core comprises a hollow cylindrical Venturi core body and a support platform arranged on an outer periphery of the hollow cylindrical Venturi core body; an end of the hollow cylindrical Venturi core body far away from the support platform is welded between the water inlet and the air inlet, and the support platform is arranged in a circular ring shape and welded on an inner side wall of the nozzle body.

Preferably, the inner wall of the nozzle body located at one side of the accommodating through hole is provided with an annular groove which is concaved toward an outer wall of the nozzle body; and an outer side of the bushing is provided with an annular accommodating groove, and the annular accommodating groove is provided with the sealing rubber ring which is adapted to the annular groove. When the bushing is installed with the nozzle body, the annular rubber ring of the bushing will be engaged into the annular groove of the nozzle body. At this time, the bushing and the nozzle body can be closely connected, thus realizing the sealed connection between the bushing and the nozzle body, so that both ends of the closed air cavity can be sealed and the air tightness is better.

Preferably, the air cavity communication port is defined at the support platform. Specifically, when an air inlet is used for air intake, the air reaches the gap between the Nozzle body Venturi core and the nozzle body through the air inlet, then the air reaches the gap between the bushing and the nozzle body through the air cavity communication port, and then the air fills the closed air cavity formed by the gap, and then the air in the closed air cavity is discharged through the air outlet holes.

Preferably, the bushing comprises a bushing body and a nozzle core, the hollow cylindrical Venturi core body is inserted into an end of the bushing body, and the other end of the bushing body is provided with the nozzle core. As a preferred mode, the bushing body has a trumpet-like structure, the hollow cylindrical Venturi core body is inserted into the small-diameter end of the bushing body, and the large-diameter end of the bushing body is provided with the nozzle core. It should be noted that the part of the hollow cylindrical Venturi core body that penetrates through the middle of the support platform and protrudes a predetermined distance will be inserted into the small-diameter end of the bushing body, so that water can reach the bushing through the nozzle body Venturi core, and then can be sprayed from the nozzle core.

Preferably, a driven member is arranged at an end of the bushing body near the hollow cylindrical Venturi core body, and a cam structure corresponding with the driven member is arranged on the support platform. As a preferred solution, the cam structure can be set as a structure similar to a right triangle, wherein one right-angled side is connected with the support platform. The driven member is a sheet-like structure that protrudes to the side far away from the nozzle surface cover, and has arc transition treatment at the corner. Of course, the cam structure is not necessarily a structure similar to a right triangle, as long as it has an inclined plane inclined from the side of the support platform to the side of the nozzle surface cover, which will not be repeated here.

When the nozzle body and the bushing need to be disassembled, the user only needs to rotate the bushing. When the driven member reaches the lowest end where the cam structure is connected with the support platform, the cam structure and the driven member begin to contact. The bushing is continually rotated, and the driven member will gradually move upward (that is, to the nozzle surface cover side) along the inclined plane of the cam structure. The annular groove on the nozzle body can be easily separated from the annular rubber ring on the bushing due to the force provided on the side far from the water inlet end. The bushing is continually rotated and the bushing can be easily removed from the nozzle body. Through this design, it is simple and convenient to disassemble the nozzle body and the bushing. The user only needs to rotate the bushing, so that the cam structure can be matched with the driven member, providing enough force to make the annular groove on the nozzle body separate from the annular rubber ring on the bushing. In this way, users can easily replace, clean or repair the bushing to achieve better maintenance and use experience.

Preferably, the air outlet holes pass through the nozzle core, and the air outlet ends of the air outlet holes are located in a gap between the nozzle core and the nozzle surface cover. The mixing of water and bubbles is made to be closer to the side of the water outlet of the nozzle surface cover, and a better massage effect is formed.

Preferably, the nozzle core can be any one of spherical nozzle core, linear nozzle core, rotatable nozzle core or nozzle core with multiple holes. When users use the nozzle, they can choose different types of nozzle cores according to their own preferences and needs (that is, choose different nozzle cores), such as spherical, linear, rotatable or nozzle core with multiple holes, so as to obtain personalized and diversified massage effects. It should be noted that due to the adoption of the nozzle body Venturi core, the water outlet can be kept normally open, and the user can rotate the nozzle surface cover to realize the rotary adjustment of the water outlet direction of the water outlet of the nozzle core, without the limitation in the traditional water outlet with a switch function that the water outlet direction of the nozzle cannot be adjusted.

Preferably, the bushing is provided with a locking slot, and a side of the nozzle surface cover is provided with a buckle engageable in the locking slot. During installation, the connection between the nozzle surface cover and the bushing is realized by clamping the buckle on the nozzle surface cover into the slot at the bushing, which is simple and reliable.

Preferably, the bathtub massage nozzle further comprises a fastener with an internal thread, and an external thread is arranged on an outside of the nozzle body, and the fastener cooperates with the nozzle body to clamp a bathtub wall of a bathtub for installing and fixing the bathtub massage nozzle to the bathtub wall.

Compared with the prior art, the present invention has the following beneficial effects: the present invention provides a bathtub massage nozzle which comprises a nozzle body, a nozzle body Venturi core, a bushing and a nozzle surface cover. The gap between the nozzle body Venturi core and the nozzle body and the gap between the bushing and the nozzle body cooperatively form a closed air cavity, which is communicated with air outlet holes, and the air outlet ends of the air outlet holes are located in the gap between the bushing and the nozzle surface cover. When it is used, water flows into the nozzle body Venturi core from the water inlet, and then flows into the bushing through the nozzle body Venturi core. At the same time of water intake, air enters the air inlet, and the air reaches the gap between the nozzle body Venturi core and the nozzle body through the air inlet, then the air reaches the gap between the bushing and the nozzle body through the air cavity communication port, and then the air fills the closed air cavity; and then the air in the closed air cavity is discharged through the air outlet; at this time, the air is mixed with water in the gap between the liner and the nozzle surface cover, and then discharged through the water outlet of the nozzle surface cover, thus realizing the water spraying form of separating (water) first and then sucking (air). This arrangement can reduce the dilution and loss of bubbles in the process of water flow transmission, and then make the water flow form dense bubbles in the nozzle, which are guided by the nozzle surface cover and released along a specific area of the bathtub. The massage water flow released by the nozzle surface cover carries more dense bubbles, which can enhance the strength and effect of massage, and then better relieve the muscle fatigue at the massage place and relieve the physical and mental pressure of users.

At the same time, the nozzle surface cover and the bushing in the present application can be conveniently rotated to adjust the direction of the surface cover after installation, and different surface covers in the same bathtub can be kept in the same direction. And the positions of the water outlet holes change during the rotation of the nozzle surface cover, so that the user can adjust the position of the massage outlet water according to his own needs.

Therefore, the bathtub massage nozzle with a good massage effect has been comprehensively improved in terms of massage effect. By strengthening massage effect, providing full-body meticulous massage and improving stability and durability, the present invention can provide better massage experience and bring better comfort and relaxation effects to users.

Figure 1:
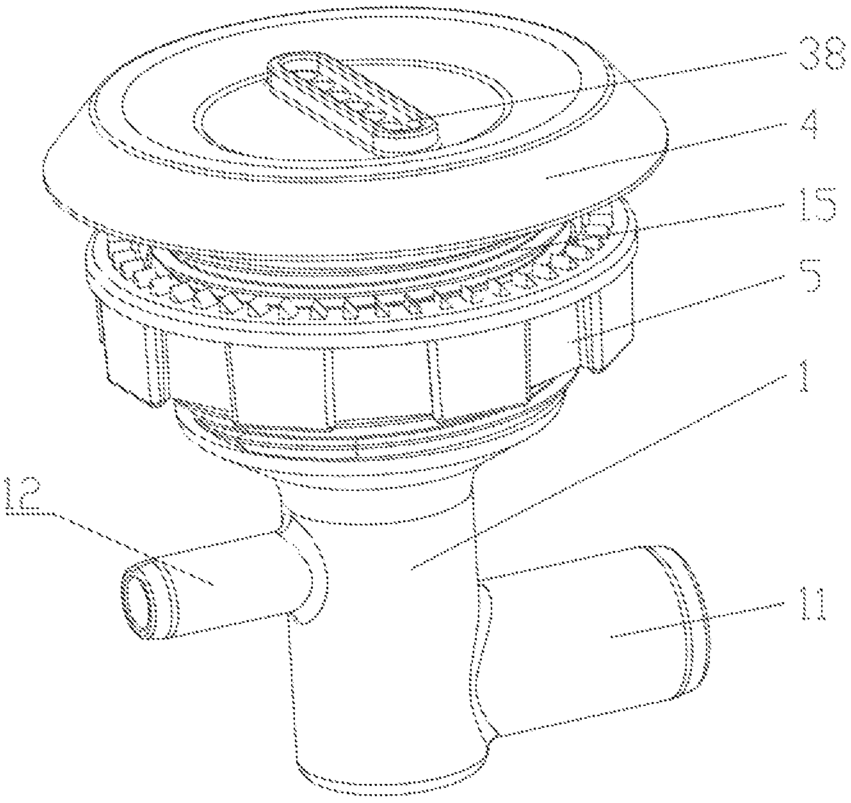
FIG. 1 is a schematic structural diagram of a bathtub massage nozzle with a good massage effect according to the present invention.

1—Nozzle body, 2—Nozzle body Venturi core, 3—Bushing, 4—Nozzle surface cover, 5—Fastener, 11—Water inlet, 12—Air inlet, 13—Accommodating through hole, 14—Annular groove, 15—External thread, 16—Closed air cavity, 21—Air cavity communication port, 22—Hollow cylindrical venturi core body, 23—Support platform, 24—Cam structure, 31—Annular accommodating groove, 32—Sealing rubber ring, 33—Bushing body, 34—Nozzle core, 35—Driven member, 36—Slot, 37—Air outlet hole, 41—Buckle.

DESCRIPTION OF EMBODIMENTS

The embodiments described below are only part of the embodiments of the present invention, but not all of them. Based on the embodiments in the present invention, all other embodiments obtained by those skilled in the art without creative work belong to the scope of protection of the present invention.

Referring to FIGS. 1 to 11, this embodiment provides a bathtub massage nozzle with a good massage effect, which includes a nozzle body 1, a nozzle body Venturi core 2, a bushing 3 and a nozzle surface cover 4. The nozzle body 1 includes a water inlet end and an opposite water spraying end; wherein the water inlet end is provided with a water inlet 11 and an air inlet 12, and the air inlet 12 is closer to the water spraying end than the water inlet 11. The water spraying end is formed with an accommodating through hole 13 for receiving the bushing 3. The nozzle body Venturi core 2 is hollow in a length direction as a water channel, two ends of the nozzle body Venturi core 2 are welded with an inner side wall of the water inlet end of the nozzle body 1, and an end of the nozzle body Venturi core 2 far from the water spraying end is hermetically welded between the water inlet 11 and the air inlet 12. The bushing 3 is arranged at the water spraying end, and includes a water inlet channel, which is connected with the nozzle body Venturi core 2. A sealing rubber ring 32 is arranged on an outer side wall of an end of the bushing 3 far away from the nozzle body Venturi core 2, and the sealing rubber ring 32 is tightly connected with an inner wall of the nozzle body 1. The side of the bushing 3 far away from the nozzle body Venturi core 2 is provided with the nozzle surface cover 4; and a side of the bushing 3 close to the nozzle surface cover 4 is provided with a predetermined number of air outlet holes 37, and air outlet ends of the air outlet holes 37 are located in a gap between the bushing 3 and the nozzle face cover 4. An end of the nozzle body Venturi core 2 far away from the water spraying end is provided with an air cavity communication port 21, and the air cavity communication port 21 communicates a gap between the nozzle body Venturi core 2 and the nozzle body 1 and a gap between the bushing 3 and the nozzle body 1, so as to form a closed air cavity 16 connected with the air outlet holes 37. It should be noted that the water inlet 11 and the air inlet 12 can be arranged in a staggered manner, or they can be arranged on the same side, as long as the air inlet 12 is located at a side of the water inlet 11 close to the side of the water spraying.

Figure 3:
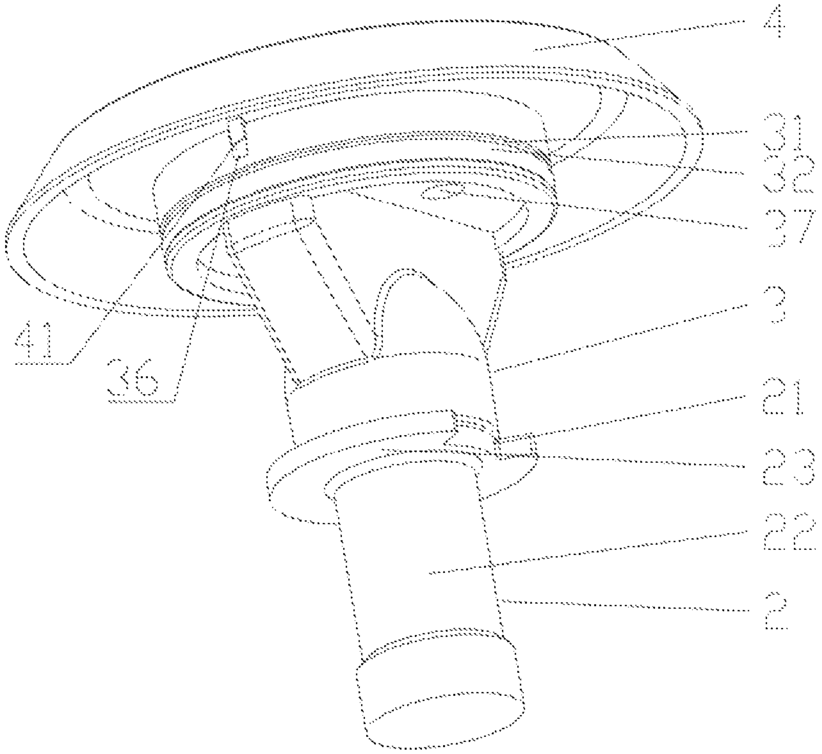
FIG. 3 is a partial structural schematic diagram of the bathtub massage nozzle with a good massage effect according to the present invention.
Figure 4:
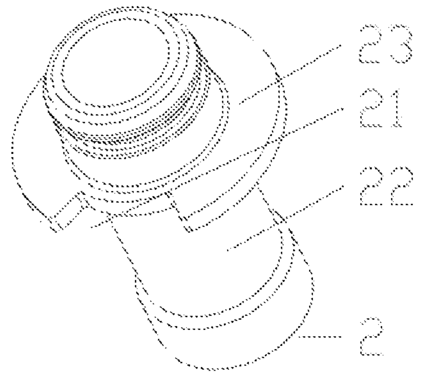
FIG. 4 is a schematic structural diagram of the nozzle body Venturi core according to the present invention.

Referring to FIG. 3 and FIG. 4, it is preferable that the nozzle body Venturi core 2 includes a hollow cylindrical Venturi core body 22 and a support platform 23 arranged on an outer periphery of the hollow cylindrical Venturi core body 22; an end of the hollow cylindrical Venturi core body 22 far away from the support platform 23 is welded between the water inlet 11 and the air inlet 12, and the support platform 23 is arranged in a circular shape and welded on an inner side wall of the nozzle body 1.

Figure 6:
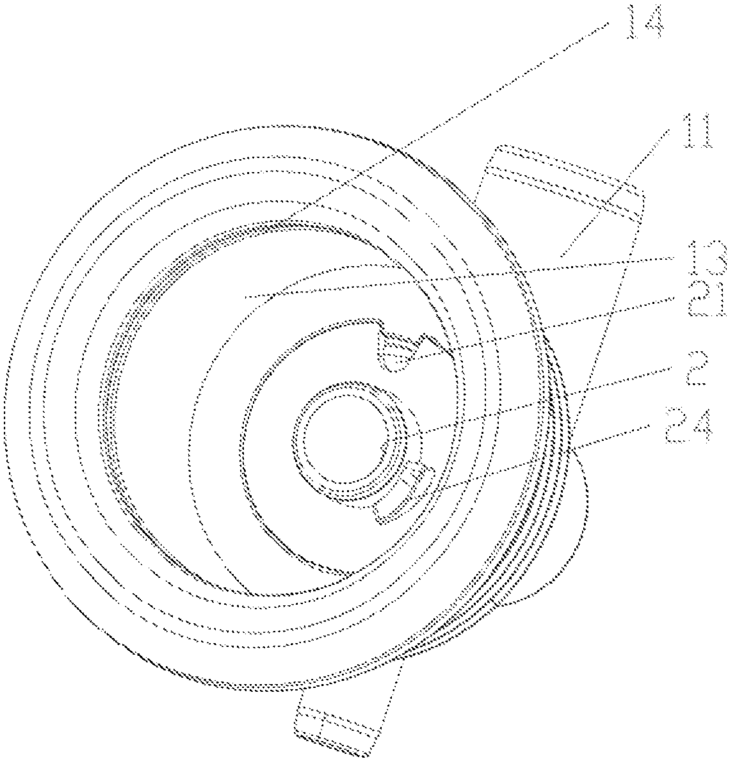
FIG. 6 is a partial structural schematic diagram of the bathtub massage nozzle with a good massage effect according to the present invention.
Figure 7:
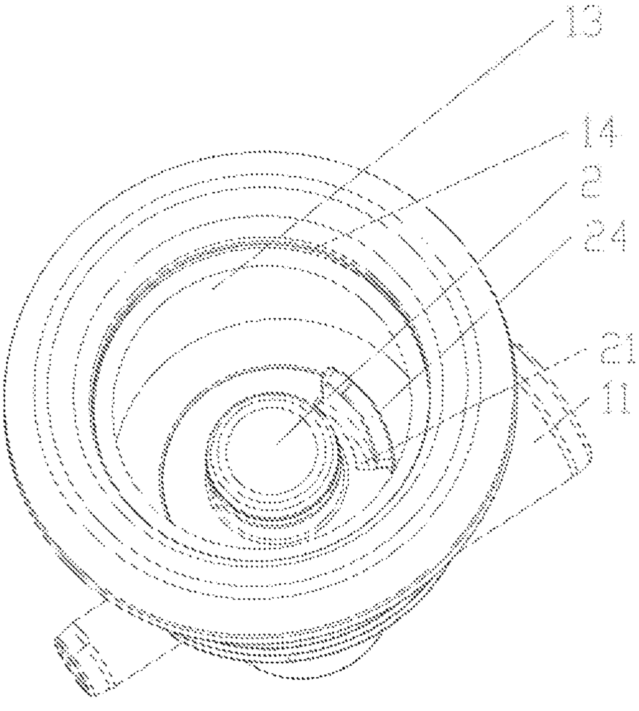
FIG. 7 is a partial structural schematic diagram of the bathtub massage nozzle with a good massage effect according to the present invention.

Referring to FIG. 3, FIG. 6 and FIG. 7, it is preferable that the inner wall of the nozzle body on one side of the accommodating through hole 13 is provided with an annular groove 14 which is concaved toward an outer wall of the nozzle body; and an outer side of the bushing 3 is provided with an annular accommodating groove 31, and the annular accommodating groove 31 is provided with the sealing rubber ring 32 which is adapted to the annular groove 14. When the bushing 3 is installed with the nozzle body 1, the annular rubber ring 32 of the bushing 3 will be clamped/engaged into the annular groove 14 of the nozzle body 1. At this time, the bushing 3 and the nozzle body 1 can be closely connected, and the sealed connection between the bushing 3 and the nozzle body 1 is realized, so that both ends of the closed air cavity 16 can be sealed and the air tightness is better.

Referring to FIGS. 3 and 4, it is preferable that the support platform 23 is provided with the air cavity communication port 21. Specifically, when air flows into the air inlet 12, the air reaches the gap between the nozzle body Venturi core 2 and the nozzle body 1 after passing through the air inlet 12, then the air reaches the gap between the bushing 3 and the nozzle body 1 through the air cavity communication port 21, and then the air fills the closed air cavity 16 formed by the gaps, and then the air in the closed air cavity 16 is discharged through the air outlet holes 37.

Figure 5:
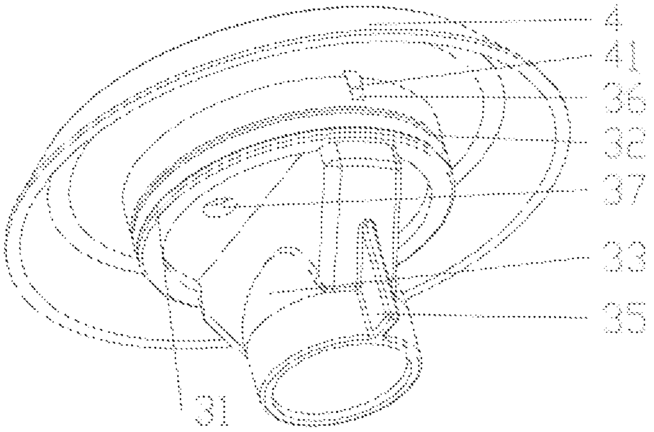
FIG. 5 is a schematic structural diagram of the bushing according to the present invention.
Figure 8:
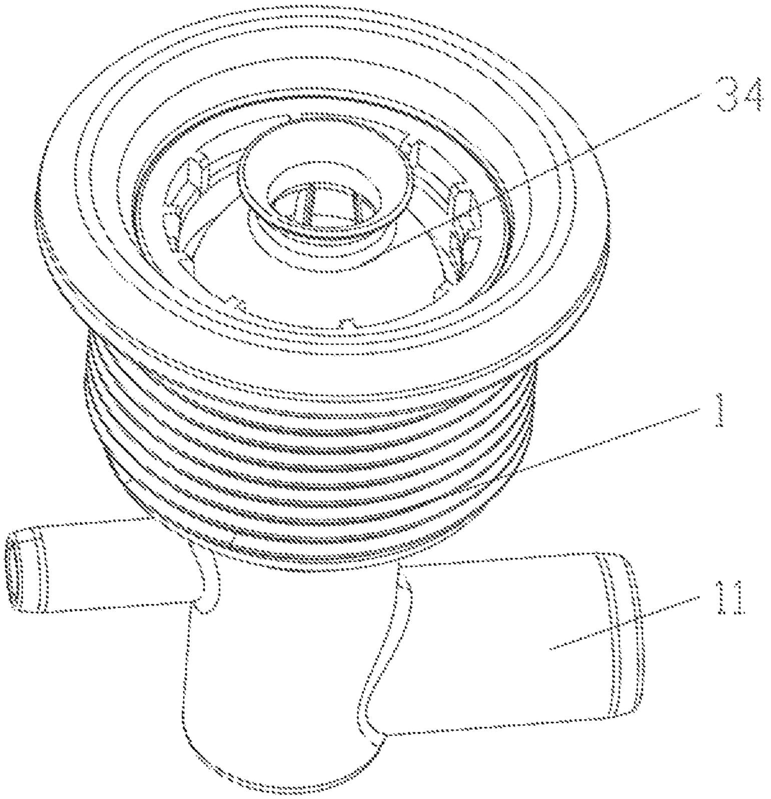
FIG. 8 is a schematic cross-sectional view of a bathtub massage nozzle with a good massage effect having a spherical nozzle core.
Figure 9:
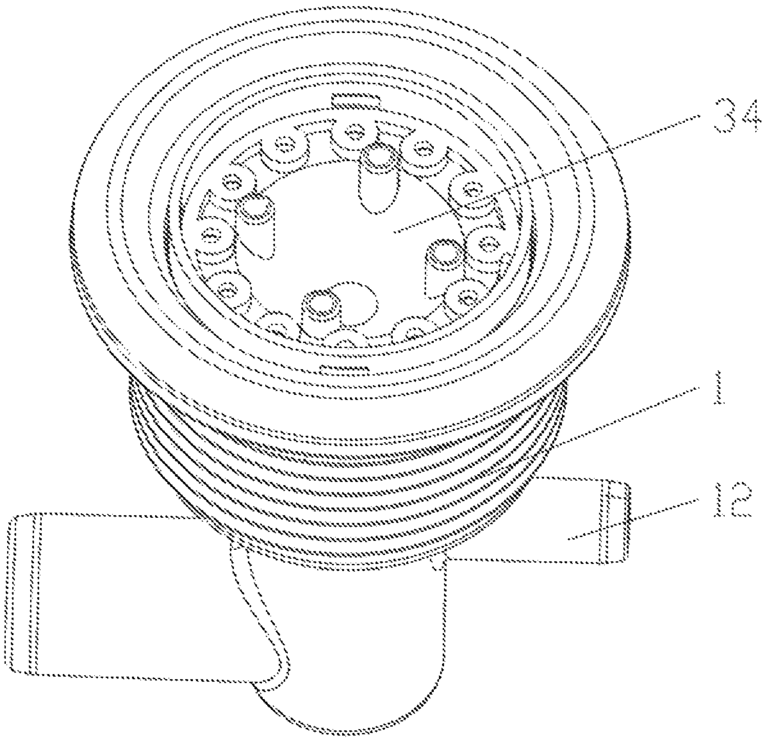
FIG. 9 is a schematic cross-sectional view of a bathtub massage nozzle with a good massage effect having a porous nozzle core.
Figure 10:
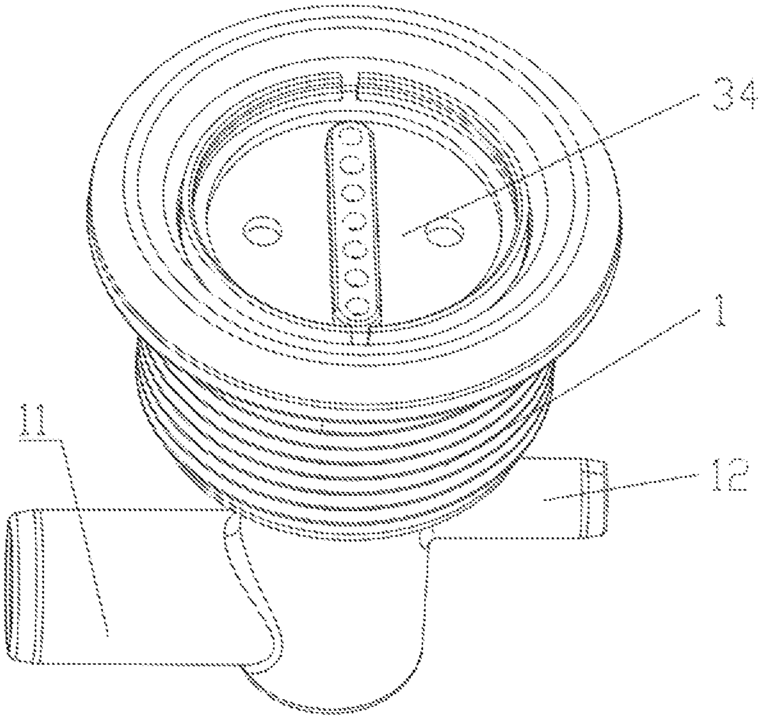
FIG. 10 is a schematic cross-sectional view of a bathtub massage nozzle with a good massage effect having a linear nozzle core.
Figure 11:
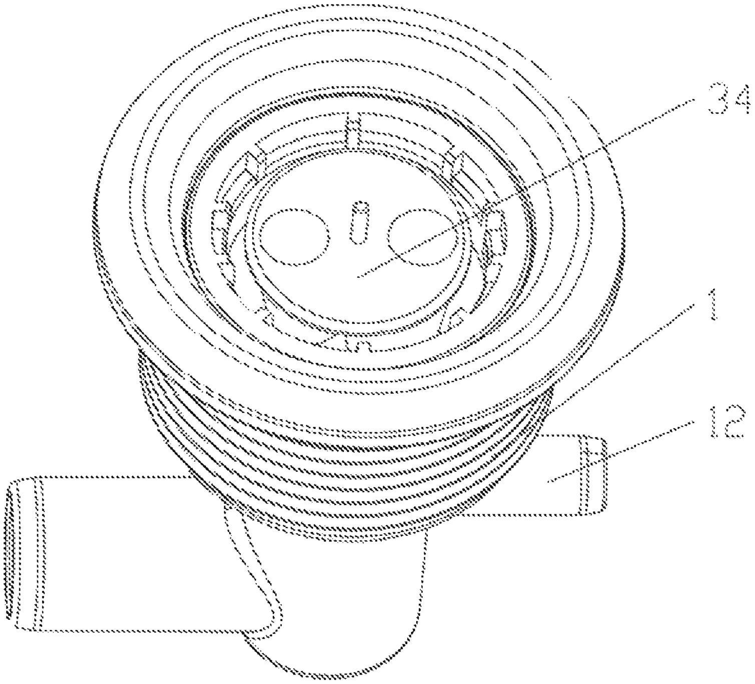
FIG. 11 is a schematic cross-sectional view of a bathtub massage nozzle with a good massage effect having a rotating nozzle core.

Referring to FIGS. 5 and 8, it is preferable that the bushing 3 includes a bushing body 33 and a nozzle core 34. The hollow cylindrical Venturi core body 22 is inserted into one end of the bushing body 33, and the other end of the bushing body 33 is provided with the nozzle core 34. As a preferred way, the bushing body 33 has a trumpet-like structure, and the small-diameter end of the bushing body 33 is for receiving the hollow cylindrical Venturi core body 22, while the outer side of the hollow cylindrical Venturi core body 22 is provided with a sealing rubber ring. When the hollow cylindrical Venturi core body 22 is inserted into the small-diameter end of the bushing body 33, the joint between the hollow cylindrical Venturi core body 22 and the bushing body 33 is tight, and water will not overflow. Secondly, the large-diameter end of the bushing body 33 is provided with the nozzle core 34. It should be noted that the part of the hollow cylindrical Venturi core body 22 passing through the middle of the support platform 23 and protruding a predetermined distance will be inserted into the small-diameter end of the bushing body 33, so that water can reach the bushing 3 via the nozzle body Venturi core 2, and then can be sprayed from the nozzle core 34.

Referring to FIG. 5, FIG. 6 and FIG. 7, an end of the bushing body 33 near the end of the hollow cylindrical Venturi core body 22 is provided with a driven member 35, and the support platform 23 is provided with a cam structure 24 corresponding to the driven member 35. The cam structure 24 protrudes from the support platform 23 upwardly and extends along a circumferential direction of the support platform 23. As a preferred solution, the cam structure 24 can be arranged in a structure similar to a right triangle, in which one right angle edge is connected with the support platform 23. The driven member 35 has a sheet-like structure that protrudes in a direction far away from the nozzle surface cover 4, and has an arc transition treatment at the corner. Of course, the cam structure 24 does not have to be approximately a right triangle, as long as it has an inclined plane inclined from the side of the support platform 23 to the side of the nozzle surface cover 4, which will not be described in detail here. It should be noted that, referring to FIGS. 6 and 7, in this embodiment, the cam structure 24 can be set in different positions according to the use situation, for example, the cam structure 24 can also be set on the nozzle body 1. The specific position setting is not limited, as long as cooperation of the cam structure 24 and the driven member 35 facilitates the disassembling of the bushing 3.

When there is a need to disassemble the nozzle body 1 and the bushing 3, the user only needs to rotate the bushing 3. When the driven member 35 reaches the lowest end where the cam structure 24 is connected with the support platform 23, the cam structure 24 comes into contact with the driven member 35. The bushing 3 is continually rotated, and the driven member 35 gradually moves upward (that is, toward the nozzle surface cover 4) along the inclined plane of the cam structure 24. Consequently, the bushing 3 is driven to move upward. The annular rubber ring on the bushing 3 can be easily removed away from the annular groove 14 of the nozzle body 1 during upward movement of the bushing 3 due to the force provided in a direction far from the water inlet end. The bushing 3 is continually rotated, and the bushing 3 can be easily removed from the nozzle body 1. With this design, it is simple and convenient to disassemble the nozzle body 1 and the bushing 3. The user only needs to rotate the bushing 3, so that the cam structure 24 can be engaged with the driven member 35, providing enough force to make the annular groove 14 on the nozzle body 1 separate from the annular rubber ring on the bushing 3. In this way, the user can easily replace, clean or repair the bushing 3 to achieve a better maintenance and use experience.

Figure 2:
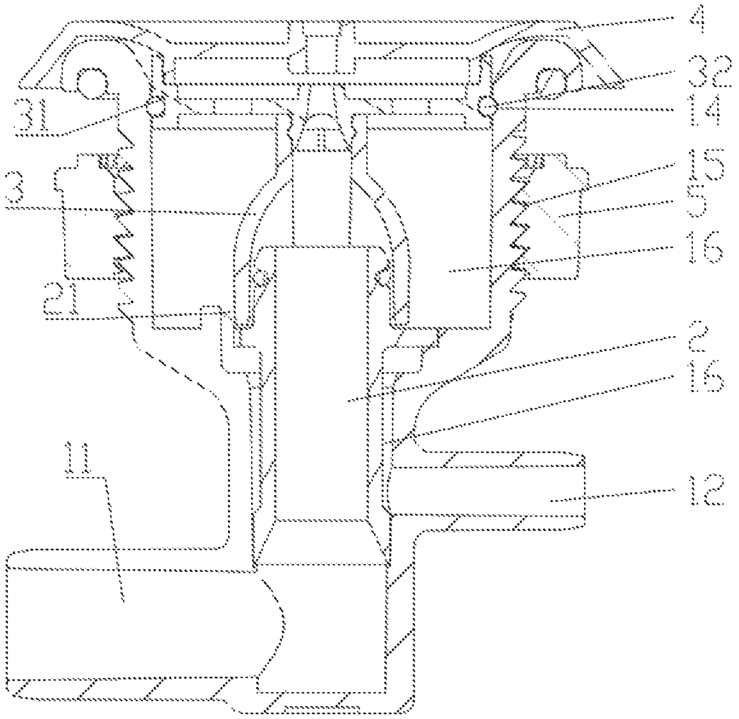
FIG. 2 is a schematic cross-sectional view of the bathtub massage nozzle with a good massage effect according to the present invention.

Referring to FIG. 2, the air outlet hole 37 passes through the nozzle core 34, and the air outlet end of the air outlet hole 37 is located in the gap between the nozzle core 34 and the nozzle surface cover 4, so that the mixing of water and air bubbles is closer to the side of the nozzle surface cover 4 corresponding to the water outlet 38 of the nozzle core 34, and a better massage effect can be achieved.

Referring to FIGS. 8 to 11, the nozzle core 34 is a spherical nozzle core 34, a linear nozzle core 34, a rotary nozzle core 34 or a porous nozzle core 34. When users use it, they can choose different types of nozzle cores 34 according to their own preferences and needs (that is, choose different nozzle cores 34), such as spherical, linear, rotary or porous nozzle cores 34, so as to obtain personalized and diversified massage effects. It should be noted that, due to the adoption of the nozzle body Venturi core 2, the water outlet can be kept normally open, and the user can rotate the nozzle surface cover 4 to realize the rotation adjustment of the water outlet direction of the nozzle core 34.

Referring to FIG. 3, it is preferable that the bushing 3 is provided with a locking slot 36, and the side of the nozzle surface cover 4 is provided with a buckle 41 engageable with the locking slot 36. During installation, the connection between the nozzle surface cover 4 and the bushing 3 is realized by the buckle 41 of the nozzle surface cover 4 engaging in the slot 36 at the bushing 3, which is simple and reliable.

Referring to FIG. 1, it is preferable that the outer side of the nozzle body 1 is provided with an external thread 15. The bathtub massage nozzle with a good massage effect also includes a fastener 5 provided with an internal thread, and the fastener 5 is screwed into the external thread 15 of the nozzle body 1. The fastener 5 cooperates with the nozzle body 1 to clamp the bathtub cylinder wall therebetween for installation and fixation.

It should also be noted that the traditional massage nozzle has a switch function, and it is necessary to keep the nozzle seat body directly facing the nozzle core when water is sprayed out, but at this time, its water outlet direction is fixed and it is difficult to adjust the water outlet direction. In the application, the nozzle body Venturi core 2 is arranged in such a way that the appearance of the nozzle can be kept uniform after installation, for example, the bathtub massage nozzle with a plurality of non-circular water outlet holes or non-circular nozzle surface covers 4 can be installed in the bathtub and the appearance can be kept uniform after adjustment. In addition, the nozzle surface cover 4 can be easily rotated and adjusted in use, and the user can adjust the water outlet direction according to his own massage requirements, which is difficult for the traditional massage nozzle to achieve. For example, the straight/linear water outlet can be adjusted to "-, |, \, /" and so on to meet different massage requirements.

When the bathtub massage nozzle with a good massage effect provided by the present invention is used, water flows into the nozzle body Venturi core 2 from the water inlet 11, and then flows into the bushing 3 through the nozzle body Venturi core 2. At the same time of water intake, the air enters the air inlet 12, and the air reaches the gap between the nozzle body Venturi core 2 and the nozzle body 1 through the air inlet 12. Then the air reaches the gap between the bushing 3 and the nozzle body 1 through the air cavity communication port 21, and then the air fills the closed air cavity 16, and the air in the closed air cavity 16 is discharged through the air outlet 37. At this time, the air is mixed with water in the gap between the liner 3 and the nozzle surface cover 4, and then discharged through the water outlet of the nozzle surface cover 4. The sprayed water is rich in dense bubbles, which makes the massage more powerful and exciting.

The bathtub massage nozzle with a good massage effect provided by the present invention includes a nozzle body 1, a nozzle body Venturi core 2, a bushing 3 and a nozzle surface cover 4. The gap between the nozzle body Venturi core 2 and the nozzle body 1 and the gap between the bushing 3 and the nozzle body 1 cooperatively form a closed air cavity 16, which is in communication with an air outlet hole 37, and the air outlet end of the air outlet hole 37 is located in the gap between the bushing 3 and the nozzle surface cover 4. This arrangement reduces the dilution and loss of bubbles in the process of water flow transmission, and further enables the water flow to form dense bubbles in the nozzle, which are then guided by the nozzle surface cover 4 and released along a specific area of the bathtub. The massage water flow released by the nozzle surface cover 4 carries more dense bubbles, which can enhance the strength and effect of massage, and then better relieve the muscle fatigue at the massage place and relieve the physical and mental pressure of users.

At the same time, the nozzle surface cover 4 and the bushing 3 in the present application can conveniently rotate and adjust the direction of the surface cover after installation, so that different surface covers in the same bathtub can be maintained in the same direction, and the position of the water outlet hole changes during the rotation of the nozzle surface cover 4, so that the user can adjust the position of the massage water according to his own needs.

Therefore, the bathtub massage nozzle of the present application has been comprehensively improved in terms of massage effect. By strengthening massage effect, providing full-body meticulous massage and improving stability and durability, it can provide better massage experience and bring better comfort and relaxation effects to users.

The preferred embodiments of the present invention disclosed above are only used to help explain the present invention, and are not limited to the specific embodiments described. Obviously, according to the contents of this specification, it can be modified and changed. The embodiment selected and specifically described in this specification is to better explain the principle and practical application of the present invention, so that those skilled in the art can better understand and make use of the present invention, and it is not a limitation of the present invention, and any solution after simple modification of the present invention falls into the protection scope of the present invention.

What is claimed is:

1. A bathtub massage nozzle, comprising a nozzle body, a nozzle body Venturi core, a bushing and a nozzle surface cover;

wherein the nozzle body comprises a water inlet end and a water spraying end opposite to the water inlet end;

wherein the water inlet end is provided with a water inlet and an air inlet, and the air inlet is closer to the water spraying end than the water inlet;

wherein the water spraying end is formed with an accommodating through hole for receiving the bushing;

wherein the nozzle body Venturi core is hollow and configured as a water channel in a length direction, two ends of the nozzle body Venturi core are welded with an inner side wall of the water inlet end of the nozzle body, and one of the two ends of the nozzle body Venturi core far from the water spraying end is hermetically welded between the water inlet and the air inlet;

wherein the bushing is arranged at the water spraying end and comprises a water inlet channel which is connected with the nozzle body Venturi core; a sealing rubber ring is arranged on an outer side wall of the bushing far away from the nozzle body Venturi core, and the sealing rubber ring is tightly connected with an inner wall of the nozzle body; the side of the bushing far away from the nozzle body Venturi core is provided with the nozzle surface cover; and a side of the bushing close to the nozzle surface cover is provided with air outlet holes, and air outlet ends of the air outlet holes are located in a gap between the bushing and the nozzle face cover; and wherein, the end of the nozzle body Venturi core far away from the water spraying end is provided with an air cavity communication port, and the air cavity communication port communicates a gap between the nozzle body Venturi core and the nozzle body and a gap between the bushing and the nozzle body, so as to form a closed air cavity connected with the air outlet holes.

2. The bathtub massage nozzle according to claim 1, wherein the nozzle body Venturi core comprises a hollow cylindrical Venturi core body and a support platform arranged on an outer periphery of the hollow cylindrical Venturi core body; an end of the hollow cylindrical Venturi core body far away from the support platform is welded between the water inlet and the air inlet, and the support platform is arranged in a circular ring shape and welded on an inner side wall of the nozzle body.

3. The bathtub massage nozzle according to claim 2, wherein the inner wall of the nozzle body located at one side of the accommodating through hole is provided with an annular groove which is concaved toward an outer wall of the nozzle body; and an outer side of the bushing is provided with an annular accommodating groove, and the annular accommodating groove is provided with the sealing rubber ring which is adapted to the annular groove.

4. The bathtub massage nozzle according to claim 2, wherein the air cavity communication port is defined at the support platform.

5. The bathtub massage nozzle according to claim 2, wherein the bushing comprises a bushing body and a nozzle core, the hollow cylindrical Venturi core body is inserted into an end of the bushing body, and the other end of the bushing body is provided with the nozzle core.

6. The bathtub massage nozzle according to claim 5, wherein a driven member is arranged at an end of the bushing body near the hollow cylindrical Venturi core body, and a cam structure corresponding with the driven member is arranged on the support platform.

7. The bathtub massage nozzle according to claim 5, wherein the air outlet holes pass through the nozzle core, and the air outlet ends of the air outlet holes are located in a gap between the nozzle core and the nozzle surface cover.

8. The bathtub massage nozzle according to claim 5, wherein the nozzle core is a spherical nozzle core, a straight nozzle core, a rotating nozzle core or a nozzle core with multiple holes.

9. The bathtub massage nozzle according to claim 1, wherein the bushing is provided with a locking slot, and a side of the nozzle surface cover is provided with a buckle engageable in the locking slot.

10. The bathtub massage nozzle according to claim 1, further comprising a fastener with an internal thread, and an external thread is arranged on an outside of the nozzle body, and the fastener cooperates with the nozzle body to clamp a bathtub wall of a bathtub for installing and fixing the bathtub massage nozzle to the bathtub wall.

* * * * *